US008209490B2

(12) United States Patent
Mattina et al.

(10) Patent No.: US 8,209,490 B2
(45) Date of Patent: Jun. 26, 2012

(54) PROTOCOL FOR MAINTAINING CACHE COHERENCY IN A CMP

(75) Inventors: Matthew Mattina, Worcester, MA (US); George Z. Chrysos, Milford, MA (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 10/749,752

(22) Filed: Dec. 30, 2003

(65) Prior Publication Data

US 2005/0144390 A1 Jun. 30, 2005

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. ......... 711/141; 711/121; 711/130; 711/210
(58) Field of Classification Search ................. 711/121, 711/130, 141, 210
See application file for complete search history.

(56) References Cited

U.S. PATENT DOCUMENTS

| 4,445,174 | A | | 4/1984 | Fletcher | |
|---|---|---|---|---|---|
| 5,559,986 | A | * | 9/1996 | Alpert et al. | 711/144 |
| 6,134,631 | A | * | 10/2000 | Jennings, III | 711/117 |
| 6,195,728 | B1 | | 2/2001 | Bordaz et al. | |
| 2003/0005228 | A1 | | 1/2003 | Wong et al. | |
| 2004/0010610 | A1 | * | 1/2004 | Cypher | 709/230 |
| 2004/0019891 | A1 | * | 1/2004 | Koenen | 718/102 |
| 2004/0230751 | A1 | * | 11/2004 | Blake et al. | 711/147 |
| 2005/0080953 | A1 | * | 4/2005 | Oner et al. | 710/52 |

OTHER PUBLICATIONS

European Patent Office, International Search Report and Written Opinion for International Application No. PCT/US2004/043425, 12 pages, Jun. 15, 2005.
Dubois, Michel et al., "Effects of Cache Coherency in Multiprocessors," IEEE Transactions on Computers, vol. C-31, No. 11, pp. 1083-1099, Nov. 1982.

* cited by examiner

*Primary Examiner* — Yaima Campos
(74) *Attorney, Agent, or Firm* — Mnemoglyphics, LLC; Lawrence M. Mennemeier

(57) ABSTRACT

The present application is a protocol for maintaining cache coherency in a CMP. The CMP design contains multiple processor cores with each core having it own private cache. In addition, the CMP has a single on-ship shared cache. The processor cores and the shared cache may be connected together with a synchronous, unbuffered bidirectional ring interconnect. In the present protocol, a single INVALIDATE-ANDACKNOWLEDGE message is sent on the ring to invalidate a particular core and acknowledge a particular core.

12 Claims, 1 Drawing Sheet

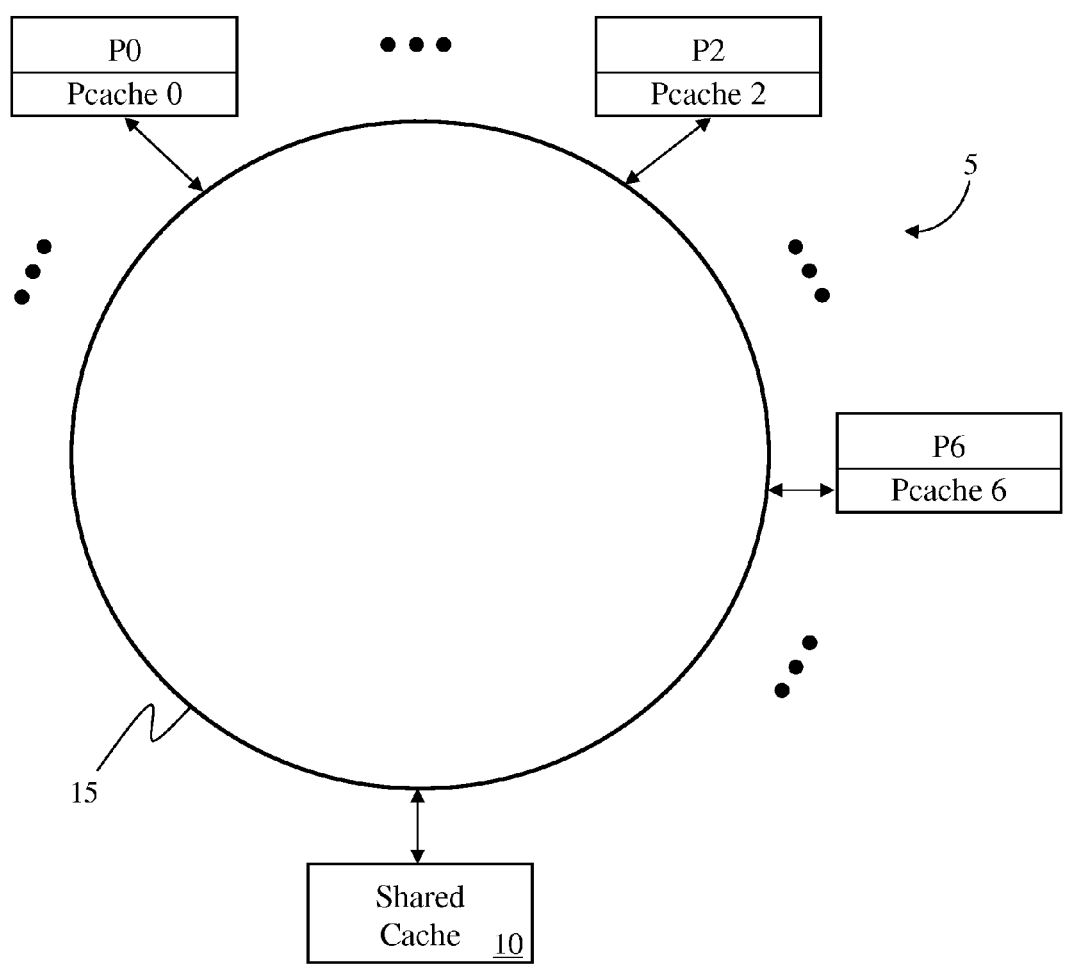

PROTOCOL FOR MAINTAINING CACHE COHERENCY IN A CMP

BACKGROUND INFORMATION

A cache coherent multiprocessor system contains two or more independent processor cores. These cores contain caches for replicating memory data close to where it will be consumed. A function of the cache coherent protocol is to keep these caches coherent, meaning, to ensure a consistent view of memory.

A cache coherent CMP is a special case of a cache coherent multiprocessor system. In a CMP, the independent processor cores are integrated onto a single piece of silicon. Currently, there is no protocol to ensure cache coherency in a CMP. Thus, a need exists for an on-chip cache coherence protocol maintaining coherency among the on-chip processor caches.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

FIG. 1 is a block diagram of a CMP on a ring interconnect.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

FIG. 1 illustrates a CMP design containing multiple processor cores P0, P2, P6, etc, with private caches on each core and a single on-chip shared cache 10. The shared cache 10 consists of multiple, independent cache banks (not shown). Each bank of the shared cache 10 is responsible for some subset of the physical address space of the system 5. That is, each shared cache bank is the "home" location for a non-overlapping portion of the physical address space. The processor cores P0, P2, etc and the shared cache 10 may be connected together with a synchronous, unbuffered bidirectional ring interconnect 15.

The CMP design of FIG. 1 contains core caches that are write-thru as opposed to write-back. Meaning that when the core writes data, rather than putting the written data into a cache on the core, the core just writes the data thru to the shared cache 10. When a core writes a piece of data, rather than storing the data in its private cache, the system 5 enables writing the data through to the shared cache 10. This is because of the bandwidth the ring interconnect 15 is able to support.

Typically, in cache coherent multiprocessor systems, a flow is needed to extract dirty data, also known as victim data, and then write the dirty data through. However, this is no longer necessary with the system 5 of FIG. 1. With this system 5, there is no need for error checking code on the private caches because the data is no longer dirty. There is another copy of the data in the shared cache 10. If the data gets corrupted, the system does not need to correct it because a backup copy exists in the shared cache 10.

Furthermore, in each core P0, P2, P6, etc, there is a coalescing write buffer or a merge buffer (not shown). Instead of the dirty data going into the private cache of a core, the dirty data may get put into this merge buffer, which is a much smaller structure. The merge buffer is continuously purging or emptying the writes back to the shared cache 10. So the system 5 does not necessarily write-thru immediately, but instead, the system 5 puts the dirty data into the merge buffer. The dirty data are put into the merge buffer and once the merge buffer is full, it pushes the writes into the shared cache 10 in a timely fashion. Since this is a CMP shared cache design, other processors on the ring 15 may request this data that was written by one of the cores and pushed out. So by pushing the data out to the shared cache 10 in a timely fashion, the data is being placed in a common place where other processor on the CMP can have access to the data.

In the system of FIG. 1, the caches are block based, and stores in the cores are subblock based. So when a store occurs, it is storing 1, 2, 4, 8, or 16 bytes of data. Advantageously, the merge buffer will coalesce multiple stores to the same block, but different bytes, before doing the write-thru, thus saving bandwidth.

As stated previously, FIG. 1 illustrates a non-blocking ring interconnect 15. There is no buffering in the ring 15, so transactions are always going around the ring 15. For example, if the system 5 is at processor P0 on the ring 15, and a message is being sent to processor P6 on the ring 15, there are five processors in between P0 and P6. The system 5 knows that if the message is sent during cycle X, the system 5 will get the message at X+5 cycles. This means that there is a fixed deterministic latency in this system 5 since the packet (message) never gets blocked in the ring 15.

The present coherence protocol is designed to maintain coherence only within a CMP. Assuming a standard invalidate-based protocol, with the usual 4-state MESI design for maintaining cache coherence between chips, in a shared cache the block can be in one of four states.

1. Not present
   b. Block X is not present in the shared cache (or in any of the core caches).
Present and owned by core C
   c. Block X is in the shared cache and core C has exclusive write privileges for block X.
Present and not owned and custodian=C
   d. Block X is in the shared cache and a single core has a copy
   e. of block X.
Present and not owned and no custodian
   f. Block X is in the shared cache but multiple cores have copies of block X.
   g. Where:
   X=the physical address of requested block
   R=the core that requested the READ of block X
   W=core that initiated a WRITE of block X
   H=home shared cache bank for X
   O=core that temporarily owns block X The above protocol describes the fundamental operations initiated by the cores during READS (loads) and WRITES (stores). First a READ flow will be discussed and then a WRITE flow.

In a READ flow, when core R executes a load to address X and address X is not contained in the core cache, a READ message is sent to home shared cache bank H for address X.

The home shared cache bank H can take three possible actions, depending on the state of block X as recorded by H.

Initially, if the state of X is not present, then in this case H does not have a copy of X in the shared cache. Thus, H sends a request to the memory buffer to fetch block X from memory. When H receives block X from memory, it will deliver the block to R, and H will record that R is the custodian, since R is the only core with a copy of block X.

Second, if the state of X is present, not owned, custodian=R, then in this instance, assume that H receives another READ request, but this time from R1. H does contain the requested block and no private cache has an exclusive copy of the block. H reads the block from the cache and delivers it to R1. H also marks the block as having no custodian since multiple cores (R and R1) now have copies of block X.

Finally, if the state of X is present and owned by core O, then in this case, H does contain the requested block, but core O contains an exclusive copy of the block. Thus H sends an EVICT message to core O. H then stalls the request to X and waits for a response from O. Once O receives the EVICT message, it sends the updated data for block X to H. Upon H receiving block X, it delivers block X to R.

In a WRITE flow, when core W executes a store to address X and address X is not present in the coalescing write buffer, a WRITE message is sent to home shared cache bank H for address X on the ring. The home shared cache bank H can take four possible actions, depending on the state of block X.

Initially, if the state of X is not present, then in this case, H does not have a copy of X in the shared cache. Thus H sends a request to the memory buffer to fetch block X from memory. When H receives block X from memory, it delivers a WRITE ACKNOWLEDGEMENT signal to core W, and records core W as the custodian of block X.

Secondly, if the state of X is present, not owned and custodian is R, then in this case, H does contain the requested block. H sends a merged INVALIDATEANDACKNOWLEDGE signal around the ring, using the properties of the ring. The INVALIDATE part is delivered only to core R, the custodian, invalidating the cached copy. The WRITEACKNOWLEDGEMENT part is delivered only to core W. This is advantageous because the shared cache is only sending one message to invalidate to core R and acknowledgement to core W. With the ring interconnect, there is no longer a need to send two separate messages. However, if the custodian is the same as the core that is initiating the WRITE, then no invalidate is sent. All other steps would remain the same. H then records W as the owner of block X and changes the custodian to W because no other core can now have a cached copy of X.

Next, if the state of X is present, not owned and no custodian, then in this instance, block X is present, but there is no custodian. This means that H does not know which cores have cached copies of X. Therefore, H sends a single INVALIDATEALLAND WRITEACKNOWLEDGE message around the ring. The INVALDIATE part is delivered to all cores, invalidating the cached copies. The WRITEACKNOWLEDGEMENT part is delivered only to core W, the processor that requested the write. H changes the custodian to W because no other core can now have a cached copy of X.

Finally, if the state of X is present, owned by core O, then in this case, H does contain the requested block, but core O contains an exclusive copy of the block. Thus, H sends an EVICT message to core O. Then H stalls the request to X and waits for a response from O. When O receives the EVICT message, it sends the updated data for block X to H. When H receives block X, it delivers a WRITE ACKNOWLEDGEMENT to core W, and records core W as the custodian of block X.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method for maintain cache coherency comprising:
receiving, with a shared cache, a write request referencing a block from a requesting processor core of the plurality of processor cores on a processor, wherein the plurality of processor cores each include a private cache, and wherein the plurality of cores and the shared cache are connected by a ring interconnect;
generating a single message, with the shared cache, in response to receiving the write request;
delivering an invalidation part of the single message to at least the second processor core;
delivering a write-acknowledgement part of the single message only to the requesting processor core;
invalidating the block in the private cache included in the second processor core in response to the second processor core receiving the invalidation part of the single message; and
write-acknowledging the write request for the requesting processor core in response to the requesting processor core receiving the write-acknowledgment part of the single message transmitted on the ring interconnect.

2. The method of claim 1, wherein the shared cache includes one or more banks, wherein the one or more cache banks is responsible for a subset of a physical address space of a computer system including the processor, and wherein the block is associated with a physical address of the physical address space of the computer system.

3. The method of claim 1 wherein the first message includes an InvalidateAndAcknowledge message , and wherein generating the InvalidateAndAcknowledge message, with the shared cache, is further in response to the block being present in the shared cache and the second processor core being a custodian for the block.

4. The method of claim 1 wherein the first message includes an InvalidateAllAndAcknowledge message, and wherein generating the InvalidateAllAndAcknowledge message, with the shared cache, is further in response to the block not being present in the shared cache and none of the plurality of processor cores being a custodian for the block.

5. The method of claim 1 wherein the plurality of processor cores writes data through to the shared cache.

6. The method of claim 1 wherein the plurality of processor cores each include a merge buffer, and wherein each of the merge buffers are to coalesce multiple stores to a same block.

7. The method of claim 6 wherein each private cache including in the plurality of cores are not to hold dirty data, and wherein each of the merger buffers are to hold the dirty data.

8. The method of claim 1, further comprising fetching, with the shared memory, a second block from a memory and generating, with the shared memory, a write acknowledge message to provide a write acknowledgement to the requesting processor core in response to receiving a second write request referencing the second block, the second block not being present in the shared cache and not being owned by any of the plurality of processor cores.

9. The method of claim 8 further comprising generating, with the shared cache, an evict message to evict a third block from an owning processor core of the plurality of processor cores and generating a second write acknowledge message to provide a second write acknowledgment to the requesting processor core in response to receiving a third write request referencing the third block, the third block being present in the shared cache and the owning processor core of the plurality of cores owns the third block.

10. The method of claim 1 wherein a bank of the shared cache is to be a home location for a non-overlapping portion of a physical address space associated with the block.

11. The method of claim 1 wherein the ring interconnect includes a synchronous, unbuffered, bidirectional, ring interconnect.

12. The method of claim 1 wherein the first message has a fixed deterministic latency around the ring interconnect.

* * * * *